US012613381B2

(12) United States Patent
Bian

(10) Patent No.: US 12,613,381 B2
(45) Date of Patent: Apr. 28, 2026

(54) METAMATERIAL LAYERS FOR USE WITH OPTICAL COMPONENTS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 516 days.

(21) Appl. No.: 17/684,840

(22) Filed: Mar. 2, 2022

(65) Prior Publication Data

US 2023/0280549 A1 Sep. 7, 2023

(51) Int. Cl.
G02B 6/42 (2006.01)
G02B 1/00 (2006.01)

(52) U.S. Cl.
CPC .......... G02B 6/4203 (2013.01); G02B 1/002 (2013.01); G02B 6/42 (2013.01)

(58) Field of Classification Search
CPC .................................................... G02B 6/4203
See application file for complete search history.

(56) References Cited

U.S. PATENT DOCUMENTS

| 7,421,163 | B1 * | 9/2008 | Tong | .................... G02B 6/4204 |
| | | | | 385/37 |
| 10,126,500 | B2 | 11/2018 | Qi et al. | |

| 10,197,731 | B2 | 2/2019 | Teng et al. | |
| 10,649,140 | B1 | 5/2020 | Bian et al. | |
| 11,215,756 | B2 | 1/2022 | Bian et al. | |
| 11,385,408 | B2 | 7/2022 | Bian et al. | |
| 11,782,214 | B2 | 10/2023 | Peng et al. | |
| 2009/0116790 | A1 * | 5/2009 | Mossberg | .......... G02B 6/02057 |
| | | | | 385/37 |
| 2017/0017034 | A1 | 1/2017 | Painchaud et al. | |
| 2018/0120504 | A1 * | 5/2018 | Qi | ........................ G02B 6/3636 |
| 2021/0055477 | A1 | 2/2021 | Bian et al. | |
| 2021/0311253 | A1 | 10/2021 | Bian et al. | |

FOREIGN PATENT DOCUMENTS

| CN | 113093336 | A | 7/2021 |
| CN | 113534334 | A | 10/2021 |
| CN | 113640925 | A | 11/2021 |
| WO | 2021250098 | A1 | 12/2021 |

OTHER PUBLICATIONS

German Patent Office, First Office Action issued in German Patent Application No. 102023100453.0 on Feb. 17, 2024; 12 pages.

(Continued)

*Primary Examiner* — Chris H Chu

(74) *Attorney, Agent, or Firm* — Thompson Hine LLP; Anthony Canale

(57) ABSTRACT

Structures including an optical component, such as an edge coupler, and methods of fabricating such structures. The structure includes a substrate, a waveguide core over the substrate, and a metamaterial layer positioned in a vertical direction between the waveguide core and the substrate. The metamaterial layer includes a set of elements separated by a set of gaps and a dielectric material in the set of gaps.

19 Claims, 11 Drawing Sheets

(56)           References Cited

OTHER PUBLICATIONS

Pavel Cheben et al., "Refractive index engineering with subwavelength gratings for efficient microphotonic couplers and planar waveguide multiplexers," Optics Letter 35, 2526-2528 (2010).

T. Barwicz et al., "An o-band metamaterial converter interfacing standard optical fibers to silicon nanophotonic waveguides," 2015 Optical Fiber Communications Conference and Exhibition (OFC), pp. 1-3, doi: 10.1364/OFC.2015. Th3F.3 (2015).

M. Teng et al., "Trident Shape SOI Metamaterial Fiber-to-Chip Edge Coupler," 2019 Optical Fiber Communications Conference and Exhibition (OFC), pp. 1-3 (2019).

Kuanping Shang et al., "Silicon nitride tri-layer vertical Y-junction and 3D couplers with arbitrary splitting ratio for photonic integrated circuits," Opt. Express 25, 10474-10483 (2017).

R. S. Tummidi and M. Webster, "Multilayer Silicon Nitride-Based Coupler Integrated into a Silicon Photonics Platform with <1 dB Coupling Loss to a Standard SMF over O, S, C and L Optical Bands," 2020 Optical Fiber Communications Conference and Exhibition (OFC), pp. 1-3 (2020).

Mu, Xin & Wu, Sailong & Cheng, Lirong & Fu, H. Y. Edge Couplers in Silicon Photonic Integrated Circuits: A Review. Applied Sciences. 10. 1538. 10.3390/app10041538 (2020).

Martin Papes et al., "Fiber-chip edge coupler with large mode size for silicon photonic wire waveguides," Opt. Express 24, 5026-5038 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

Y. Bian et al., "Monolithically integrated silicon nitride platform," 2021 Optical Fiber Communications Conference and Exhibition (OFC), pp. 1-3 (2021).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th31.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Bian, Yusheng et al., "Optical Components in the Back-End-Of-Line Stack of a Photonics Chip" filed on Jan. 12, 2021 as a U.S. Appl. No. 17/146,864.

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Metamaterial Edge Couplers in the Back-End-Of-Line Stack of a Photonics Chip" filed on Feb. 11, 2021 as a U.S. Appl. No. 17/173,639.

Sahin, Asli et al., "Photonics Integrated Circuit With Silicon Nitride Waveguide Edge Coupler" filed on Feb. 19, 2021 as a U.S. Appl. No. 17/179,532.

China National Intellectual Property Administration; Office Action and Search Report issued in Chinese Patent Application No. 202310127084.4 on Feb. 4, 2026; 14 pages.

* cited by examiner

METAMATERIAL LAYERS FOR USE WITH OPTICAL COMPONENTS

BACKGROUND

The disclosure relates to photonics chips and, more specifically, to structures including an optical component, such as an edge coupler, and methods of fabricating such structures.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected with another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to leakage loss to the substrate. The leakage loss may be particularly high when coupling light of transverse magnetic mode from a single-mode optical fiber to a silicon nitride waveguide core. One approach for mitigating the leakage loss to the substrate is to remove a portion of the substrate beneath the edge coupler to define an undercut.

Improved structures including an optical component, such as an edge coupler, and methods of fabricating such structures are needed.

SUMMARY

In an embodiment of the invention, a structure includes a substrate, a waveguide core over the substrate, and a metamaterial layer positioned in a vertical direction between the waveguide core and the substrate. The metamaterial layer includes a plurality of elements separated by a plurality of gaps and a dielectric material in the plurality of gaps.

In an embodiment of the invention, a method includes forming a waveguide core over a substrate, and forming a metamaterial layer positioned in a vertical direction between the waveguide core and the substrate. The metamaterial layer includes a plurality of elements separated by a plurality of gaps and a dielectric material in the plurality of gaps.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
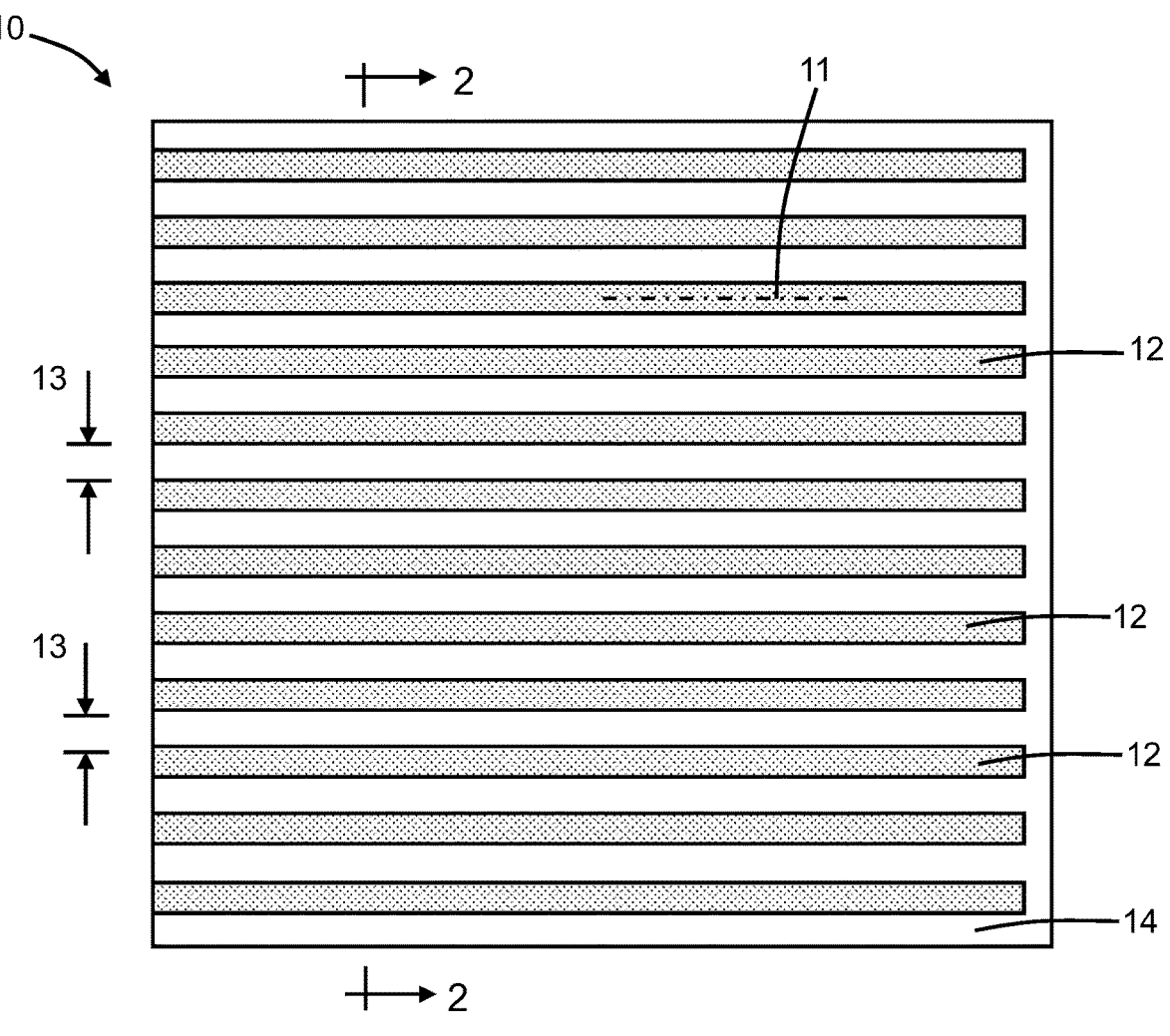
FIG. 1 is a top view of a structure at an initial fabrication stage of a processing method in accordance with embodiments of the invention.
Figure 2:
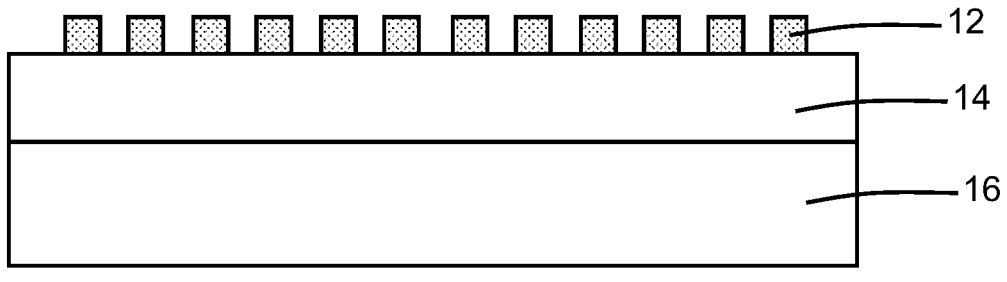
FIG. 2 is a cross-sectional view of the structure taken generally along line 2-2 in FIG. 1.

With reference to FIGS. 1, 2 and in accordance with embodiments of the invention, a structure 10 for an edge coupler includes a plurality of elements 12 having a juxtaposed (i.e., side-by-side) arrangement. The elements 12 may be positioned in a one-dimensional array over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the elements 12 from the substrate 16. The elements 12 may be comprised of a semiconductor material, such as single-crystal silicon. In an embodiment, the elements 12 may be formed by patterning a single-crystal silicon device layer of a silicon-on-insulator substrate with lithography and etching processes, and the dielectric layer 14 may operate as an etch stop when patterning the elements 12.

The elements 12 are constituted by elongated ridges (i.e., strips) and gaps 13 may separate adjacent elements 12 to define a grating-like structure. The elements 12 may be aligned along respective longitudinal axes 11. In an embodiment, the elements 12 may have a parallel alignment. In the representative embodiment, the elements 12 are embodied in elongated ridges that are disconnected from each other. In an embodiment, the pitch and duty cycle of the elements 12 may be uniform to define a periodic juxtaposed arrangement. In alternative embodiments, the pitch and/or the duty cycle of the elements 12 may be apodized (i.e., non-uniform) to define a non-periodic juxtaposed arrangement. In an embodiment, each element 12 may have a rectangular or square cross-sectional shape in a direction parallel to the longitudinal axis 11. In an embodiment, the elements 12 may have equal or substantially equal lengths.

Figure 4:
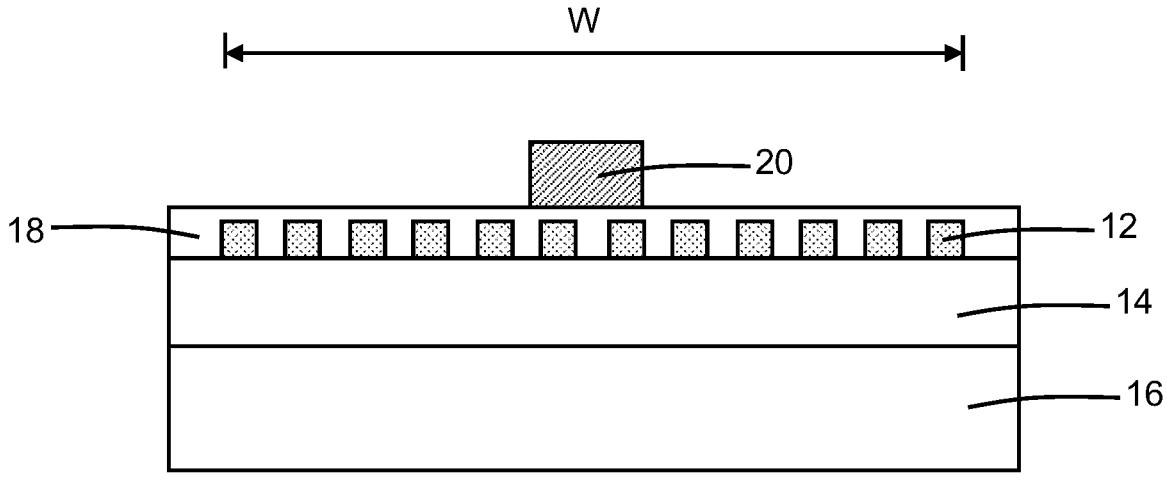
FIG. 4 is a cross-sectional view of the structure taken generally along line 4-4 in FIG. 3.
Figure 3:
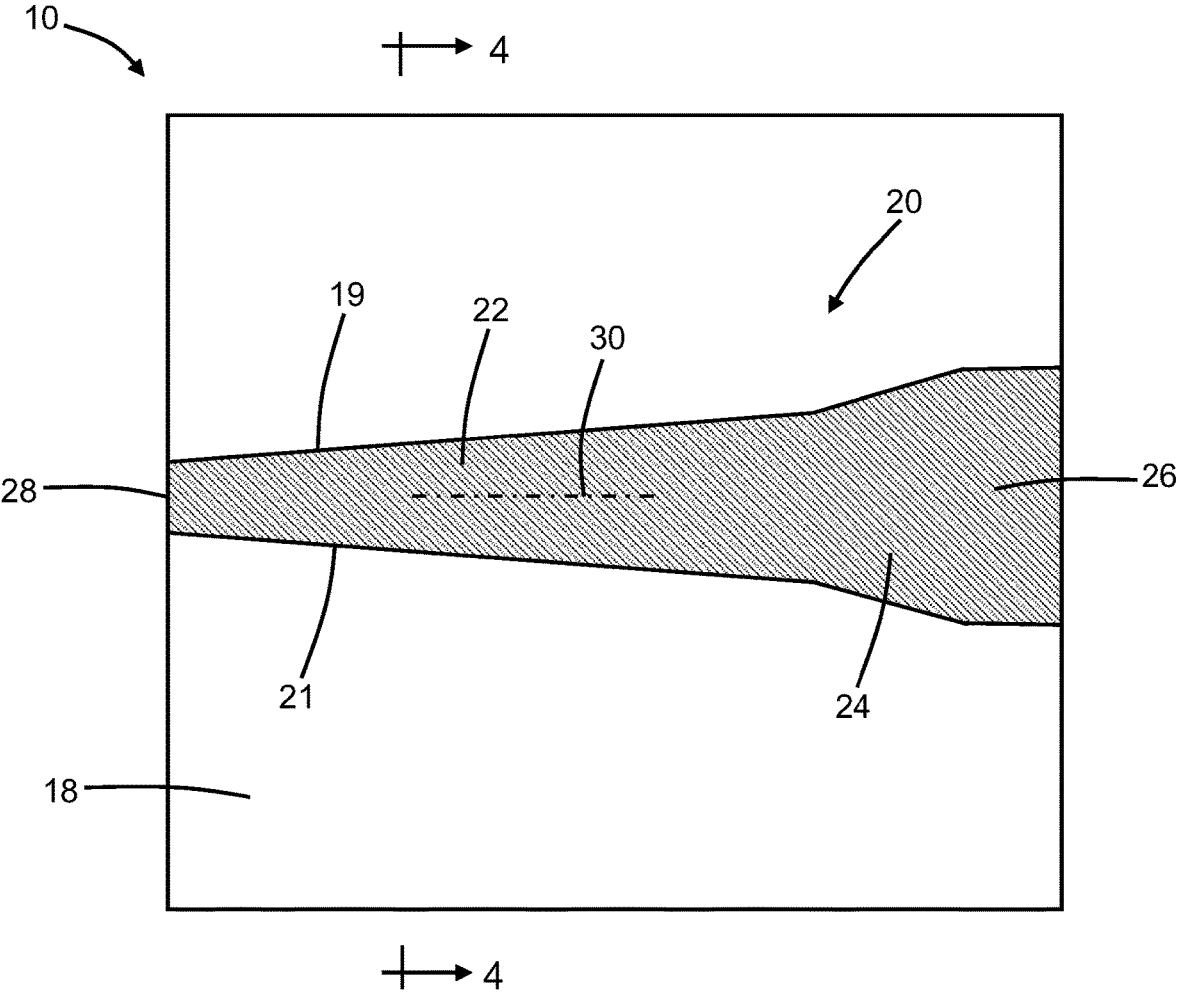
FIG. 3 is a top view of a structure at a fabrication stage of the processing method subsequent to FIG. 1.

With reference to FIGS. 3, 4 in which like reference numerals refer to like features in FIGS. 1, 2 and at a subsequent fabrication stage, a dielectric layer 18 is formed over the elements 12. The dielectric layer 18 may be comprised of a dielectric material, such as silicon dioxide. The elements 12 are embedded in the dielectric layer 18 because the dielectric layer 18 is thicker than the height of the elements 12. The thickness of the dielectric layer 18 and the height of the elements 12 may be adjustable variables. The dielectric material constituting the dielectric layer 18 may have a lower refractive index than the material constituting the elements.

The dielectric material of the dielectric layer 18 is located in the gaps 13 between adjacent pairs of the elements 12. The elements 12 and the dielectric material of dielectric layer 18 in the gaps 13 may define a metamaterial layer. The metamaterial layer including the elements 12 and the dielectric material of the dielectric layer 18 in the gaps 13 can be treated as an effective homogeneous material with an effective refractive index that is intermediate between the refractive index of the material constituting the elements 12 and the refractive index of the dielectric material filling the spaces between the elements 12. In an embodiment, the metamaterial layer may extend over a given width W in a direction transverse to the longitudinal axes 11 of the elements 12. In alternative embodiments, the metamaterial layer may be formed in multiple levels and from different materials for the elements 12 in each level.

An edge coupler may be formed on the dielectric layer 18 with positioning over the elements 12. The edge coupler may include a waveguide core 20 having an inverse taper 22, an inverse taper 24, a section 26 connected by the inverse taper 24 to the inverse taper 22, and an end surface defining a facet 28 that terminates the inverse taper 22. The inverse taper 22 increases in width with increasing distance from the facet 28. An inverse taper refers to a tapered section of a waveguide core characterized by a gradual increase in width along a mode propagation direction. The section 26 of the waveguide core 20 may be connected to other optical components.

The waveguide core 20 may be comprised of a dielectric material, such as silicon nitride. In an embodiment, the waveguide core 20 may be formed by depositing a layer of its constituent material by chemical vapor deposition and patterning the deposited layer by lithography and etching processes, and the dielectric layer 18 may operate as an etch stop when patterning the waveguide core 20.

The waveguide core 20 may be aligned along a longitudinal axis 30, and the waveguide core 20 may have opposite sidewalls 19, 21 that converge at the facet 28 terminating the inverse taper 22. In an embodiment, the longitudinal axis 11 of each element 12 may be aligned parallel to the longitudinal axis 30 of the waveguide core 20. The waveguide core 20 may overlap with one or more of the elements 12. In an embodiment, the waveguide core 20 may have a non-overlapping relationship with one or more of the elements 12. In an embodiment, the waveguide core 20 may be centrally positioned in a lateral direction over the elements

12 to provide a symmetrical arrangement. In an embodiment, the waveguide core 20 may be centrally positioned in a lateral direction over the elements 12 to provide a symmetrical arrangement with the waveguide core 20 overlapping at least one of the elements and the waveguide core 20 having a non-overlapping arrangement with at least one of the elements 12. In an embodiment, the waveguide core 20 may be centrally positioned in a lateral direction over the elements 12 to provide a symmetrical arrangement in which the waveguide core 20 overlaps with at least one of the elements, the waveguide core 20 has a non-overlapping arrangement with multiple elements 12, and equal numbers of non-overlapped elements 12 are positioned adjacent to each of the sidewalls 19, 21 of the waveguide core 20.

Figure 5:
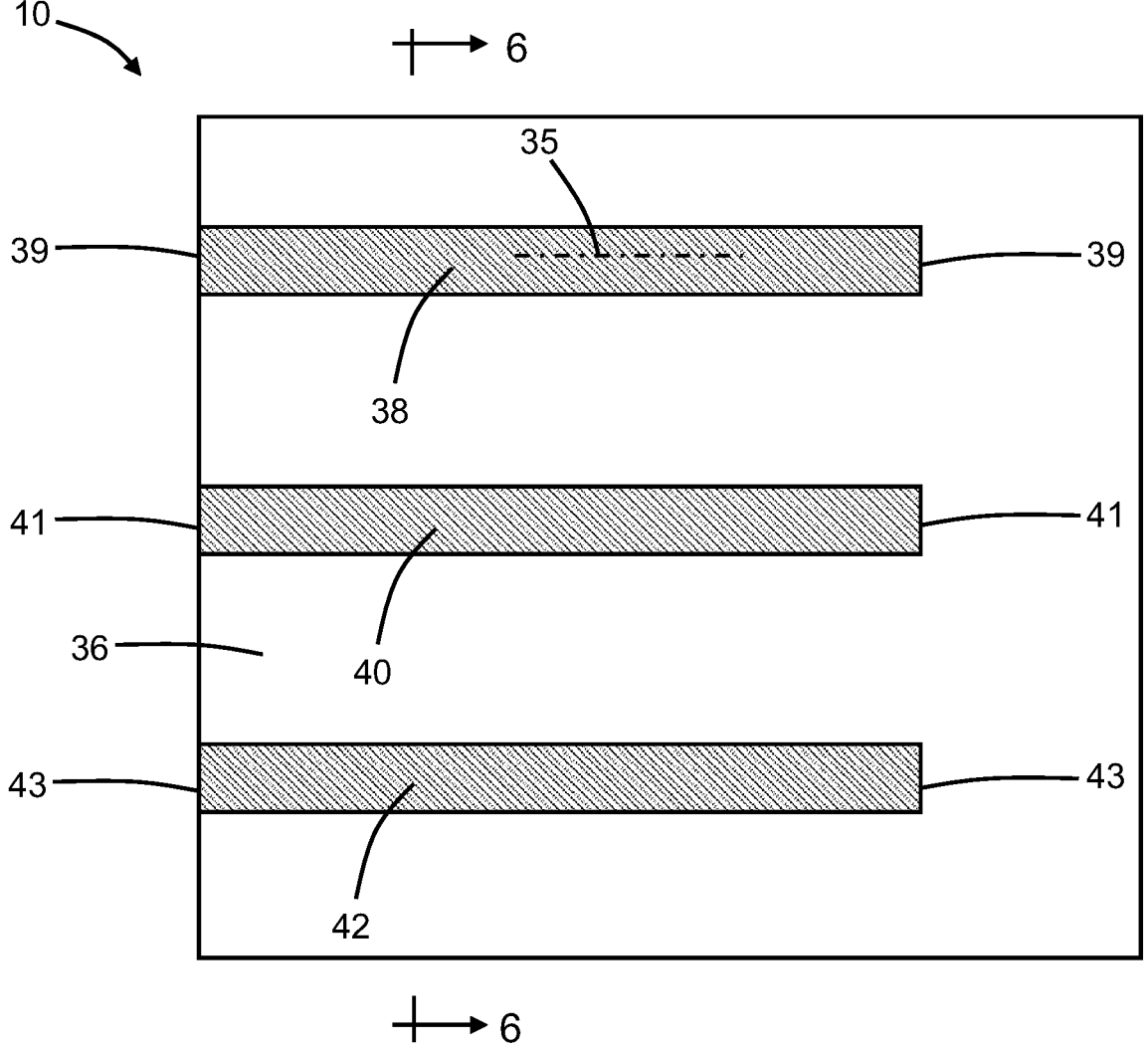
FIG. 5 is a top view of a structure at a fabrication stage of the processing method subsequent to FIG. 3.
Figure 6:
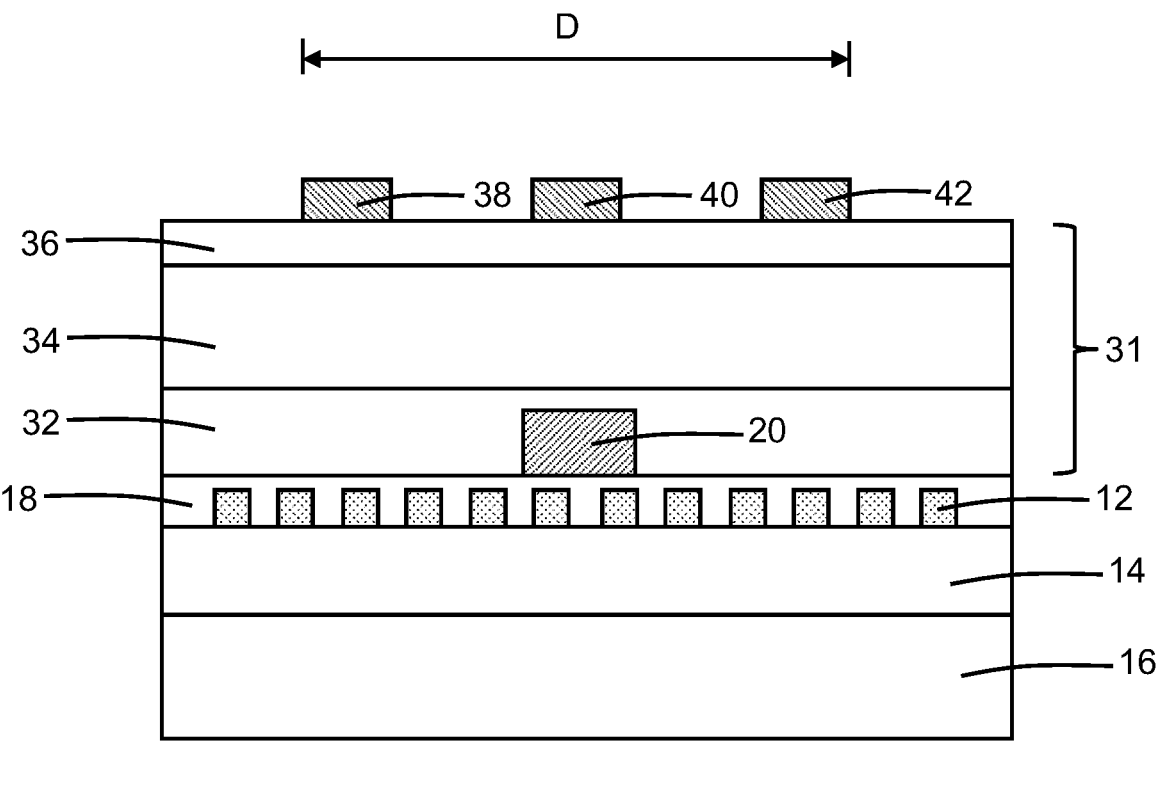
FIG. 6 is a cross-sectional view of the structure taken generally along line 6-6 in FIG. 5.

With reference to FIGS. 5, 6 in which like reference numerals refer to like features in FIGS. 3, 4 and at a subsequent fabrication stage, dielectric layers 32, 34, 36 of a back-end-of-line stack 31 may be formed over the dielectric layer 18 and waveguide core 20. The waveguide core 20 is embedded in the dielectric layer 32. The dielectric layers 32, 34, 36 may be comprised of a dielectric material, such as silicon dioxide, tetraethylorthosilicate silicon dioxide, or fluorinated-tetraethylorthosilicate silicon dioxide.

The edge coupler may include additional waveguide cores 38, 40, 42 that are formed in a level of the back-end-of-line stack 31 over the waveguide core 20. The waveguide cores 38, 40, 42 have a laterally-spaced juxtaposed arrangement with positioning on the dielectric layer 36. In an embodiment, a distance D of largest separation between the outermost edges of the waveguide core 32 and the waveguide core 42 may be less than the width W of the metamaterial layer. In alternative embodiments, the distance D may be greater than or equal to the width W.

The waveguide cores 38, 40, 42 may be comprised of a dielectric material, such as silicon-carbon nitride or hydrogenated silicon-carbon nitride, that is deposited and patterned by lithography and etching processes. In an alternative embodiment, the waveguide cores 38, 40, 42 may be comprised of silicon nitride. Each of the waveguide cores 38, 40, 42 may be aligned along a longitudinal axis 35. The waveguide core 38 may be truncated at opposite ends 39 to define a length for the waveguide core 38, the waveguide core 40 may be truncated at opposite ends 41 to define a length for the waveguide core 40, and the waveguide core 40 may be truncated at opposite ends 43 to define a length for the waveguide core 38. The waveguide core 40 is laterally located between the waveguide core 38 and the waveguide core 42, and the waveguide core 40 may overlap with the inverse taper 24 of the waveguide core 20. In an embodiment, the waveguide cores 38, 40, 42 may be positioned in a lateral direction over the waveguide core 20 to provide a symmetrical arrangement.

In an embodiment, the waveguide core 38 may curve away from the central waveguide core 40 such that the distance between the waveguide core 38 and the waveguide core 40 increases with increasing distance from the facet 28 of the waveguide core 20. In an embodiment, the waveguide core 42 may curve away from the central waveguide core 40 in an opposite direction of curvature than the waveguide core 38 such that the distance between the waveguide core 42 and the waveguide core 40 increases with increasing distance from the facet 28 of the waveguide core 20.

Figure 7:
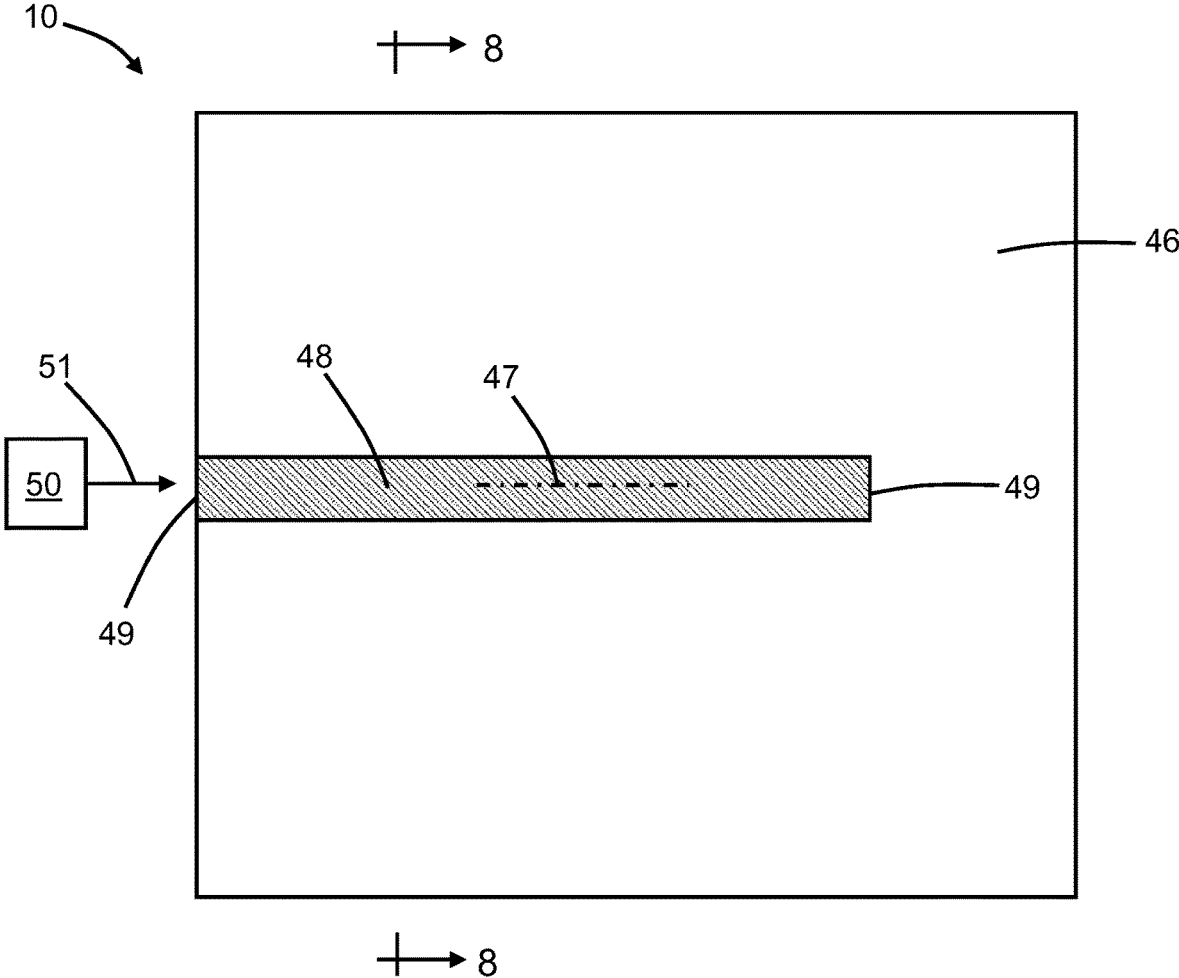
FIG. 7 is a top view of a structure at a fabrication stage of the processing method subsequent to FIG. 5.
Figure 8:
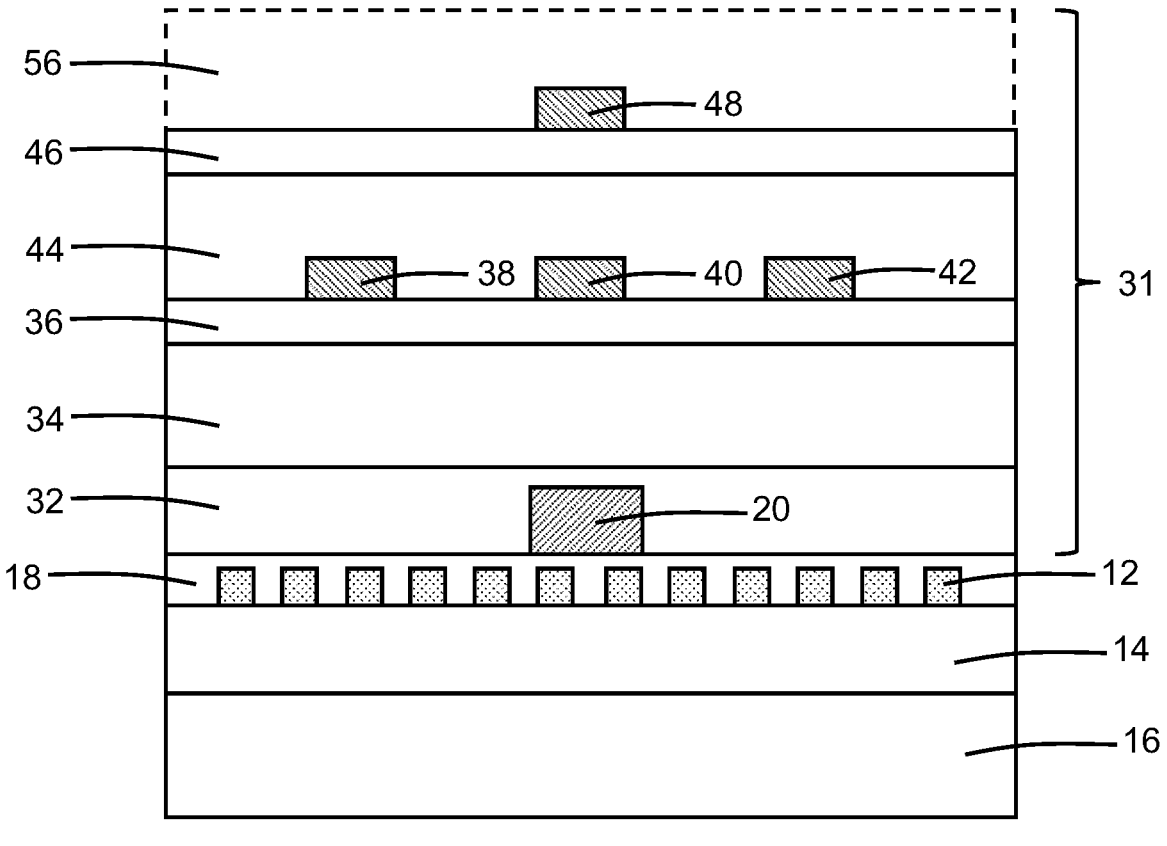
FIG. 8 is a cross-sectional view of the structure taken generally along line 8-8 in FIG. 7.

With reference to FIGS. 7, 8 in which like reference numerals refer to like features in FIGS. 5, 6 and at a subsequent fabrication stage, dielectric layers 44, 46 of the back-end-of-line stack 31 may be formed over the waveguide cores 38, 40, 42. The dielectric layers 44, 46 may be comprised of one or more dielectric materials, such as silicon dioxide, tetraethylorthosilicate silicon dioxide, or fluorinated-tetraethylorthosilicate silicon dioxide. The waveguide cores 38, 40, 42 are embedded in the dielectric layer 44.

The edge coupler may include a waveguide core 48 that is formed in a level of the back-end-of-line stack 31 over the waveguide cores 38, 40, 42. The waveguide core 48 may overlap with the waveguide core 40, and the waveguide core 48 may be aligned along a longitudinal axis 47. In an embodiment, the longitudinal axis 47 of the waveguide core 48 may be aligned parallel to the longitudinal axes 35 of the waveguide cores 38, 40, 42.

The waveguide core 48 may be comprised of a dielectric material, such as silicon-carbon nitride or hydrogenated silicon-carbon nitride, that is deposited and patterned by lithography and etching processes. In an alternative embodiment, the waveguide core 48 may be comprised of silicon nitride. In an embodiment, the waveguide core 48 may be comprised of the same dielectric material as the waveguide cores 38, 40, 42. The waveguide core 48 may be truncated at opposite ends 49 such that the waveguide core 48 has a length. In an embodiment, the waveguide core 48 and the waveguide core 40 may have equal or substantially equal lengths. In an alternative embodiment, the waveguide core 48 may be shorter in length than the waveguide core 40.

Additional dielectric layers 56 (diagrammatically shown in dashed lines), including a moisture barrier, may be formed over the waveguide core 48.

Light (e.g., laser light) may be directed in a mode propagation direction 51 from a light source 50 toward the facet 28 of the waveguide core 20. The light may have a given wavelength, intensity, mode shape, and mode size, and the edge coupler providing the representative optical component may provide spot size conversion for the light. In an embodiment, the light source 50 may be a single-mode optical fiber placed adjacent to the facet 28. In an alternative embodiment, the light source 50 may be a semiconductor laser, and the semiconductor laser may be attached inside a cavity formed in the substrate 16. The metamaterial layer including the elements 12 and the dielectric material of the dielectric layer 18 in the gaps 13 functions to deflect light upwardly in a vertical direction away from the dielectric layer 18 and substrate 16.

The metamaterial layer including the elements 12 and the dielectric material of the dielectric layer 18 in the gaps 13 may eliminate the need for an undercut in the substrate 16 that is located beneath the edge coupler. In that regard, the substrate 16 may be solid beneath at least the inverse taper 22 of the waveguide core 20. The metamaterial layer prevents light being provided from the light source 50 to the edge coupler from interacting with the substrate 16 and the resultant insertion loss due to substrate leakage. In that regard, the metamaterial layer may function as a reflector.

The structure 10, in any of its embodiments described herein, may be integrated into a photonics chip that includes electronic components and additional optical components. For example, the electronic components may include field-effect transistors that are fabricated by CMOS processing.

Figure 9:
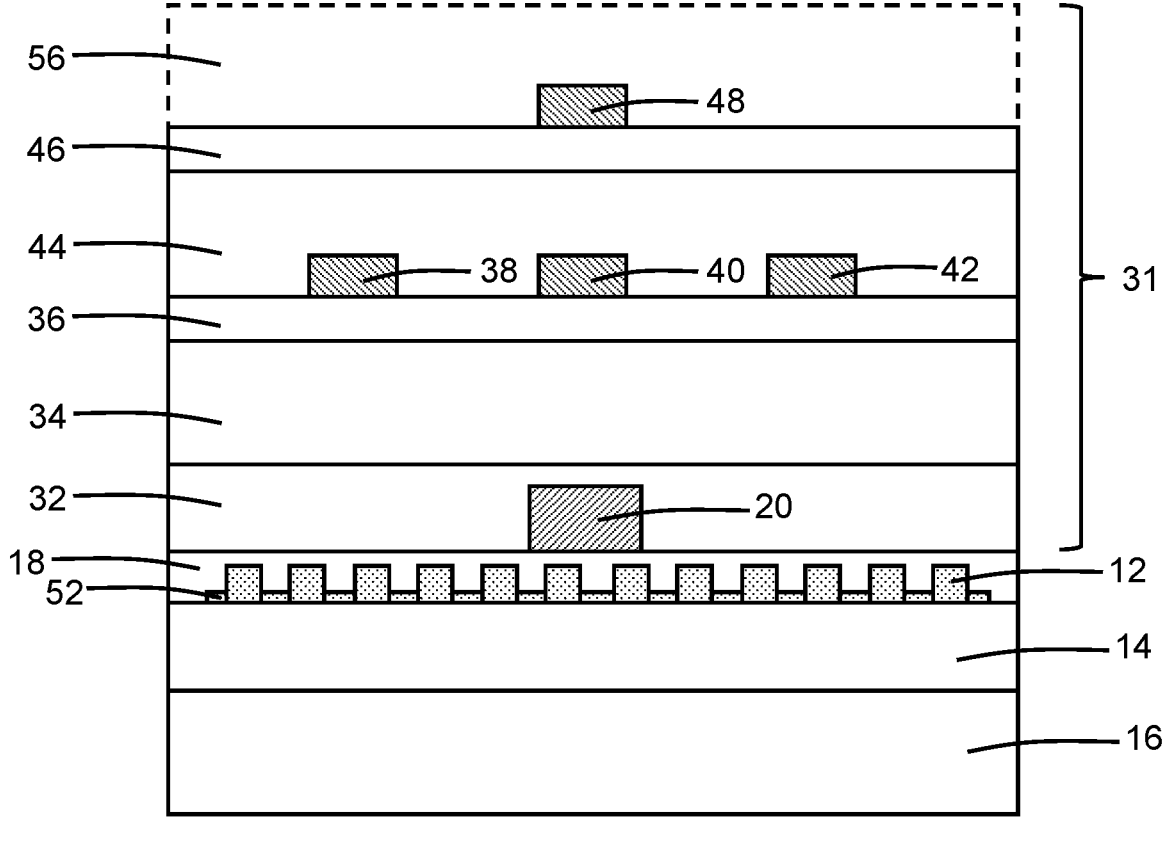
FIG. 9 is a cross-sectional view of a structure in accordance with alternative embodiments of the invention.

With reference to FIG. 9 and in accordance with alternative embodiments of the invention, lower portions of the elements 12 may be connected by a slab layer 52. The slab layer 52 may be formed when the elements 12 are patterned by lithography and etching processes. The slab layer 52 is positioned on the dielectric layer 14 and the thickness of the slab layer 52 is less than the thickness of the elements 12.

Figure 10:
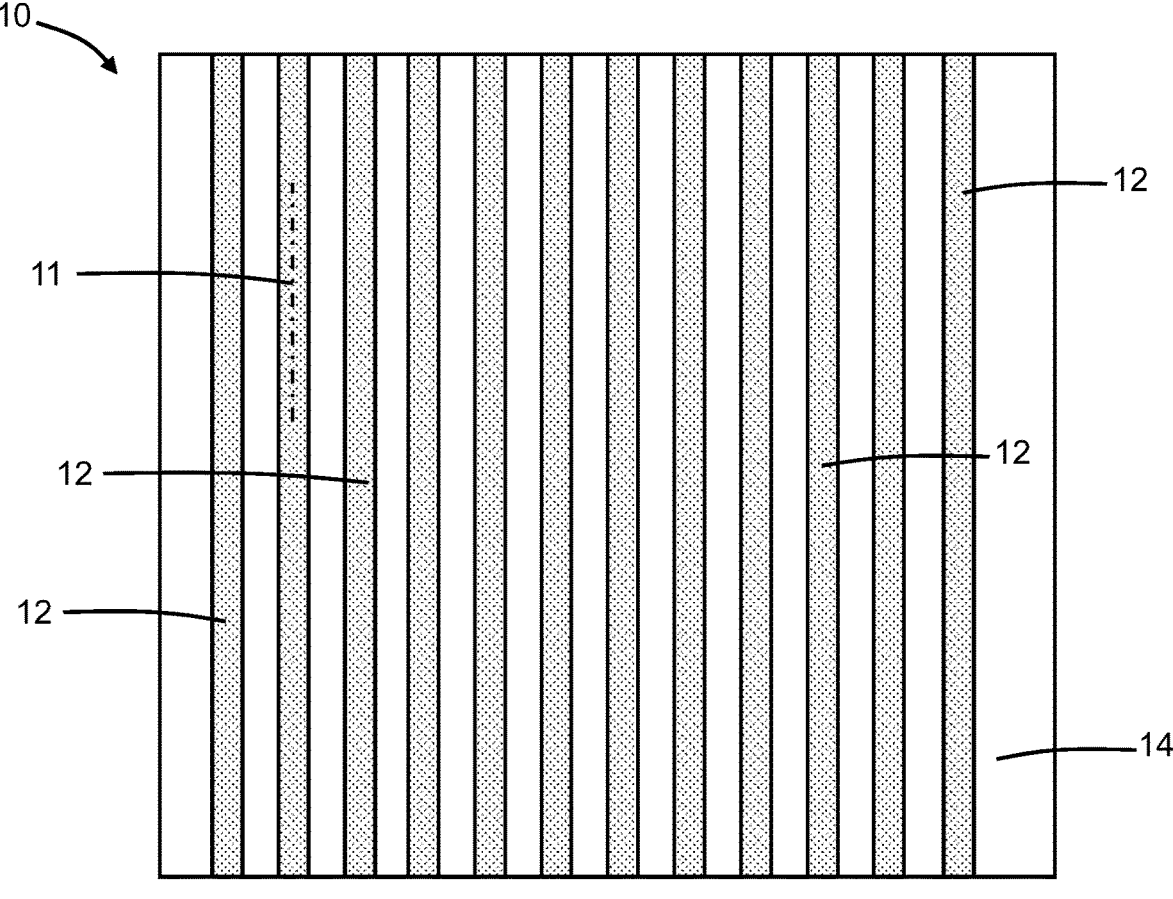
FIG. 10 is a top view of a structure in accordance with alternative embodiments of the invention.

With reference to FIG. 10 and in accordance with alternative embodiments of the invention, the elements 12 of the metamaterial layer may be oriented such that the longitudinal axis 11 of each element 12 is angled relative to the longitudinal axis 30 of the waveguide core 20. In an embodiment, the elements 12 may be oriented such that the longitudinal axis 11 of each element 12 is aligned transverse (i.e., perpendicular) to the longitudinal axis 30 of the waveguide core 20. Processing continues as previously described to form the edge coupler of the structure 10.

Figure 11:
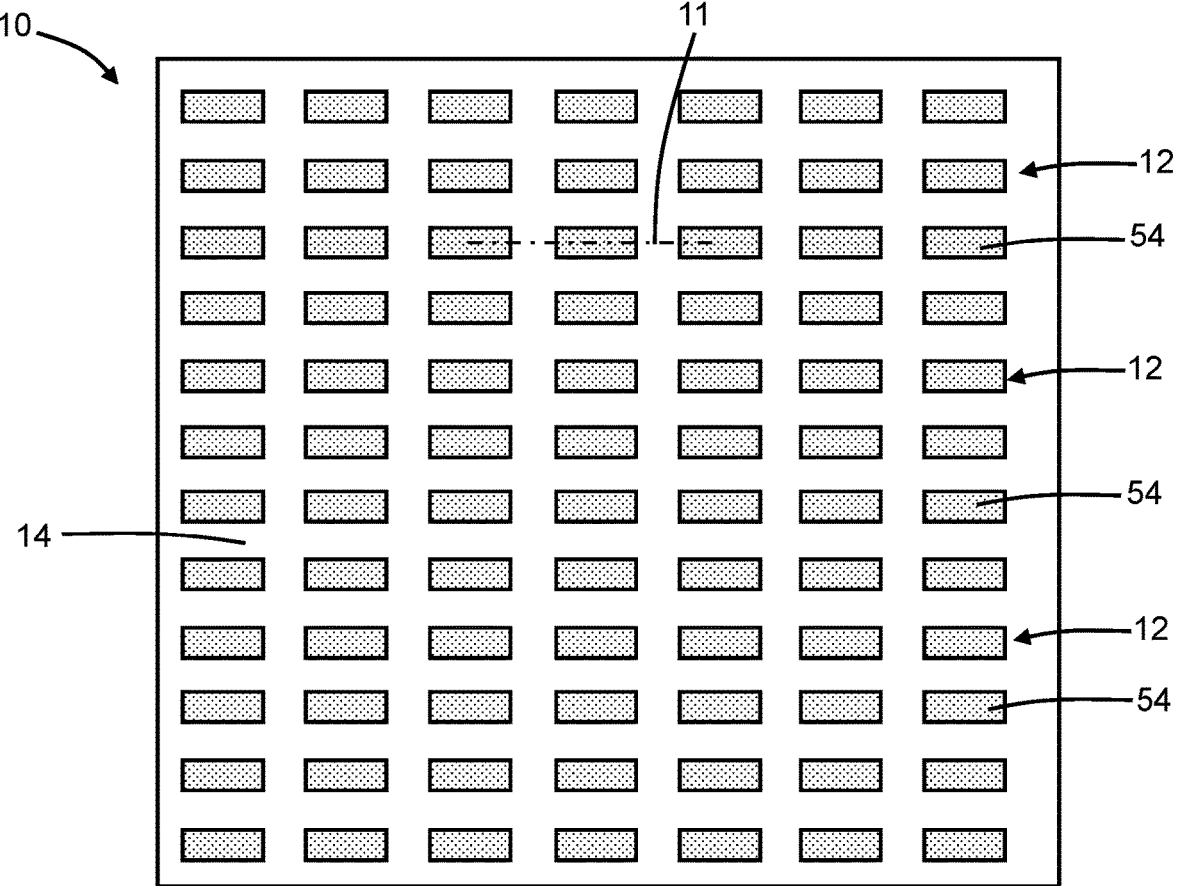
FIG. 11 is a top view of a structure in accordance with alternative embodiments of the invention.

With reference to FIG. 11 and in accordance with alternative embodiments of the invention, the elements 12 of the metamaterial layer may be partitioned into rows of segments 54. The segments 54 of each element 12 may have a spaced arrangement along the longitudinal axis 11. The segments 54 in the various rows may also be arranged in columns to define a two-dimensional array. Processing continues as previously described to form the edge coupler of the structure 10.

Figure 12:
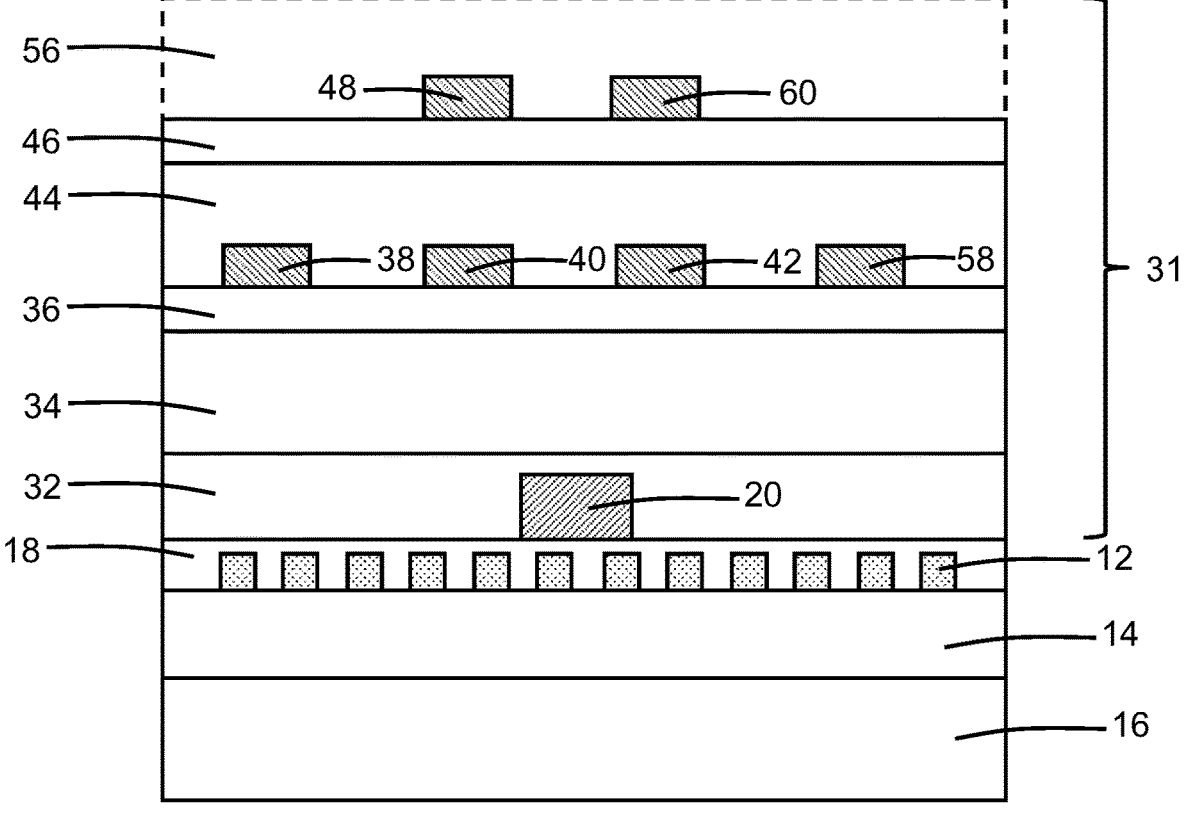
FIG. 12 is a cross-sectional view of a structure in accordance with alternative embodiments of the invention.

With reference to FIG. 12 and in accordance with alternative embodiments of the invention, the number of waveguide cores in each of the different levels of the back-end-of-line stack 31 may be altered. In an embodiment, an additional waveguide core 58 similar or identical to the waveguide cores 38, 40, 42 may be added to the level over the waveguide core 20, and the waveguide cores 38, 40, 42, 58 may be laterally positioned in a symmetrical arrangement relative to the waveguide core 20. In an embodiment, an additional waveguide core 60 similar or identical to the waveguide core 48 may be added to the level over the level including the waveguide cores 38, 40, 42, and the waveguide cores 48, 60 may be laterally positioned in a symmetrical arrangement relative to the waveguide core 20. The waveguide core 48 may be positioned to overlap with the waveguide core 40, and the waveguide core 60 may be positioned to overlap with the waveguide core 42.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a silicon-on-insulator substrate including a buried oxide layer and a semiconductor substrate;
a first waveguide core over the buried oxide layer; and
a metamaterial layer positioned in a vertical direction between the first waveguide core and the semiconductor substrate, the metamaterial layer including a plurality of elements separated by a plurality of gaps and a first dielectric material in the plurality of gaps,
wherein the first waveguide core comprises a second dielectric material different from the first dielectric material, the plurality of elements are positioned in a one-dimensional array, the first waveguide core has a first longitudinal axis, each of the plurality of elements is elongated with alignment along a second longitudinal axis, and the second longitudinal axis is aligned parallel to the first longitudinal axis.

2. The structure of claim 1 wherein the plurality of elements comprise single-crystal silicon, and the first dielectric material comprises silicon dioxide.

3. The structure of claim 1 wherein the plurality of elements comprise single-crystal silicon, and the second dielectric material comprises silicon nitride.

4. The structure of claim 1 wherein the plurality of elements comprise single-crystal silicon, and the second dielectric material comprises silicon-carbon nitride or hydrogenated silicon-carbon nitride.

5. The structure of claim 1 wherein the first waveguide core overlaps with at least one of the plurality of elements.

6. The structure of claim 1 wherein the first waveguide core has a non-overlapping arrangement with at least one of the plurality of elements.

7. The structure of claim 1 wherein the first waveguide core is centered over the plurality of elements.

8. The structure of claim 1 wherein the first waveguide core includes an inverse taper, and the semiconductor substrate is solid beneath the inverse taper.

9. The structure of claim 1 further comprising:
a dielectric layer over the plurality of elements,
wherein the dielectric layer is arranged between the metamaterial layer and the first waveguide core, the dielectric layer comprises the first dielectric material, the plurality of elements are embedded in the dielectric layer, and the first dielectric material is silicon dioxide.

10. The structure of claim 1 further comprising:
a back-end-of-line stack including a plurality of dielectric layers over the first waveguide core; and
a second waveguide core on the plurality of dielectric layers.

11. The structure of claim 10 further comprising:
a light source configured to provide light to an edge coupler including the first waveguide core and the second waveguide core,
wherein the metamaterial layer is configured to reflect the light away from the semiconductor substrate, and the light source is an optical fiber or a semiconductor laser.

12. The structure of claim 11 wherein the first waveguide core is terminated by an end surface, and the light source is configured to provide the light in a mode propagation direction aligned with the end surface.

13. The structure of claim 10 wherein the second waveguide core is truncated at opposite ends, and the second waveguide core overlaps with a portion of the first waveguide core.

14. The structure of claim 10 the second waveguide core is truncated at opposite ends, and further comprising:
a third waveguide core on the plurality of dielectric layers, the third waveguide core laterally spaced from the second waveguide core, and the third waveguide core truncated at opposite ends.

15. The structure of claim 14 further comprising:
a fourth waveguide core on the plurality of dielectric layers, the fourth waveguide core laterally spaced from the second waveguide core, the fourth waveguide core truncated at opposite ends, and the second waveguide core laterally located between the third waveguide core and the fourth waveguide core.

16. The structure of claim 1 further comprising:
a first dielectric layer between the first waveguide core and the metamaterial layer, the first dielectric layer comprising the first dielectric material.

17. The structure of claim 16 further comprising:
a second dielectric layer between the metamaterial layer and the semiconductor substrate.

18. A method comprising:
forming a waveguide core over a buried oxide layer of a semiconductor-on-insulator substrate; and
forming a metamaterial layer positioned in a vertical direction between the waveguide core and a semiconductor substrate of the semiconductor-on-insulator substrate,
wherein the metamaterial layer includes a plurality of elements separated by a plurality of gaps and a first dielectric material in the plurality of gaps, the waveguide core comprises a second dielectric material different from the first dielectric material, the plurality of elements are positioned in a one-dimensional array, the waveguide core has a first longitudinal axis, each of the plurality of elements is elongated with alignment along a second longitudinal axis, and the second longitudinal axis is aligned parallel to the first longitudinal axis.

19. The method of claim 18 wherein the waveguide core is terminated by an end surface, and further comprising:
placing a light source adjacent to the end surface of the waveguide core,
wherein the light source is configured to provide the light in a mode propagation direction aligned with the end surface of the waveguide core, and the metamaterial layer is configured to reflect the light away from the semiconductor substrate.

* * * * *